United States Patent
Ingram et al.

(10) Patent No.: US 11,107,271 B2
(45) Date of Patent: Aug. 31, 2021

(54) THREE-DIMENSIONAL POINT DATA BASED ON STEREO RECONSTRUCTION USING STRUCTURED LIGHT

(71) Applicant: THE BOEING COMPANY, Chicago, IL (US)

(72) Inventors: Luke C. Ingram, Summerville, SC (US); Anthony W. Baker, Gilbertsville, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/674,182

(22) Filed: Nov. 5, 2019

(65) Prior Publication Data

US 2021/0134053 A1 May 6, 2021

(51) Int. Cl.
*G06T 17/00* (2006.01)
*G06K 9/46* (2006.01)
*G06T 7/521* (2017.01)

(52) U.S. Cl.
CPC ............ *G06T 17/00* (2013.01); *G06K 9/46* (2013.01); *G06T 7/521* (2017.01); *G06T 2200/08* (2013.01); *G06T 2210/56* (2013.01)

(58) Field of Classification Search
CPC ..... G06T 17/00; G06T 7/521; G06T 2200/08; G06T 2210/56; G06K 9/46
See application file for complete search history.

(56) References Cited

U.S. PATENT DOCUMENTS

| 10,282,859 | B2 | 5/2019 | Hunt et al. | |
|---|---|---|---|---|
| 2012/0056982 | A1* | 3/2012 | Katz | G06T 7/521 348/43 |
| 2014/0267619 | A1* | 9/2014 | Bridges | G01B 21/045 348/46 |
| 2016/0364903 | A1* | 12/2016 | Gordon | G06T 15/205 |
| 2017/0068756 | A1* | 3/2017 | Wilsher | G06F 30/18 |
| 2018/0227571 | A1* | 8/2018 | Page | H04N 13/246 |
| 2020/0105005 | A1* | 4/2020 | Grossinger | G06T 7/579 |
| 2020/0286248 | A1* | 9/2020 | Shi | G06K 9/628 |

OTHER PUBLICATIONS

Zhang, Song, "Hi-speed 3D shape measurement with structured light methods: A review," Optics and Lasers in Engineering, vol. 106, 2018, pp. 119-131.

* cited by examiner

*Primary Examiner* — Daniel F Hajnik
(74) *Attorney, Agent, or Firm* — Moore IP Law

(57) ABSTRACT

An apparatus includes a memory configured to store multiple sets of image data. Each of the sets corresponds to a respective portion of a surface of an object and a respective portion of a structured light pattern projected onto the surface. The apparatus includes a processor configured to perform structured light reconstruction of the sets, including matching a first group of image pixels that correspond to a projected pixel of the structured light pattern in a first set of image data with a second group of image pixels that correspond to the projected pixel in a second set of image data. The processor is configured to perform stereo reconstruction of the sets, including matching one or more features detected within the first group of image pixels with one or more features detected within the second group of image pixels, to generate three-dimensional point data of the surface.

20 Claims, 6 Drawing Sheets

THREE-DIMENSIONAL POINT DATA BASED ON STEREO RECONSTRUCTION USING STRUCTURED LIGHT

FIELD OF THE DISCLOSURE

The present disclosure is generally related to generating three-dimensional point data based on image data representing a surface of a scanned object.

BACKGROUND

Three-dimensional (3D) scans are typically performed on an object to enable generation of a 3D model of the object from the scan data. Stereo reconstruction is a technique that can use conventional cameras to generate images of a surface of an object from multiple camera positions. Stereo reconstruction attempts to locate common features in overlapping images and uses the located features, along with information regarding camera positions associated with the overlapping images, to determine depth data (e.g., 3D point data) of the surface. However, stereo reconstruction is computationally expensive and has a relatively high rate of false correspondences between images (e.g., incorrectly identifying two different features from multiple images as the same feature), and exhibits reduced performance when the surface has relatively few features or is relatively untextured.

SUMMARY

In a particular implementation, an apparatus includes a memory configured to store multiple sets of image data, each of the multiple sets corresponding to a respective portion of a surface of an object and a respective portion of a structured light pattern projected onto the surface. The apparatus includes one or more processors configured to perform structured light reconstruction of the multiple sets. The structured light reconstruction includes matching a first group of image pixels that correspond to a projected pixel of the structured light pattern in a first set of image data with a second group of image pixels that correspond to the projected pixel in a second set of image data. The one or more processors are also configured to perform stereo reconstruction of the multiple sets to generate three-dimensional point data of the surface of the object. The stereo reconstruction includes matching one or more features detected within the first group of image pixels with one or more features detected within the second group of image pixels.

In another particular implementation, a method includes receiving multiple sets of image data. Each of the multiple sets corresponds to a respective portion of a surface of an object and a respective portion of a structured light pattern projected onto the surface. The method includes performing a structured light reconstruction of the multiple sets. The structured light reconstruction includes matching a first group of image pixels that correspond to a projected pixel of the structured light pattern in a first set of image data with a second group of image pixels that correspond to the projected pixel in a second set of image data. The method also includes performing stereo reconstruction of the multiple sets to generate three-dimensional point data of the surface of the object. The stereo reconstruction includes matching one or more features detected within the first group of image pixels with one or more features detected within the second group of image pixels.

In another particular implementation, a non-transitory, computer-readable medium is disclosed that stores instructions that, when executed by one or more processors, cause the one or more processors to initiate, perform, or control operations that include receiving multiple sets of image data. Each of the multiple sets corresponds to a respective portion of a surface of an object and a respective portion of a structured light pattern projected onto the surface. The operations include performing a structured light reconstruction of the multiple sets. The structured light reconstruction includes matching a first group of image pixels that correspond to a projected pixel of the structured light pattern in a first set of image data with a second group of image pixels that correspond to the projected pixel in a second set of image data. The operations also include performing stereo reconstruction of the multiple sets to generate 3D point data of the surface of the object. The stereo reconstruction includes matching one or more features detected within the first group of image pixels with one or more features detected within the second group of image pixels.

The features, functions, and advantages described herein can be achieved independently in various implementations or may be combined in yet other implementations, further details of which can be found with reference to the following description and drawings.

DETAILED DESCRIPTION

Figure 1:
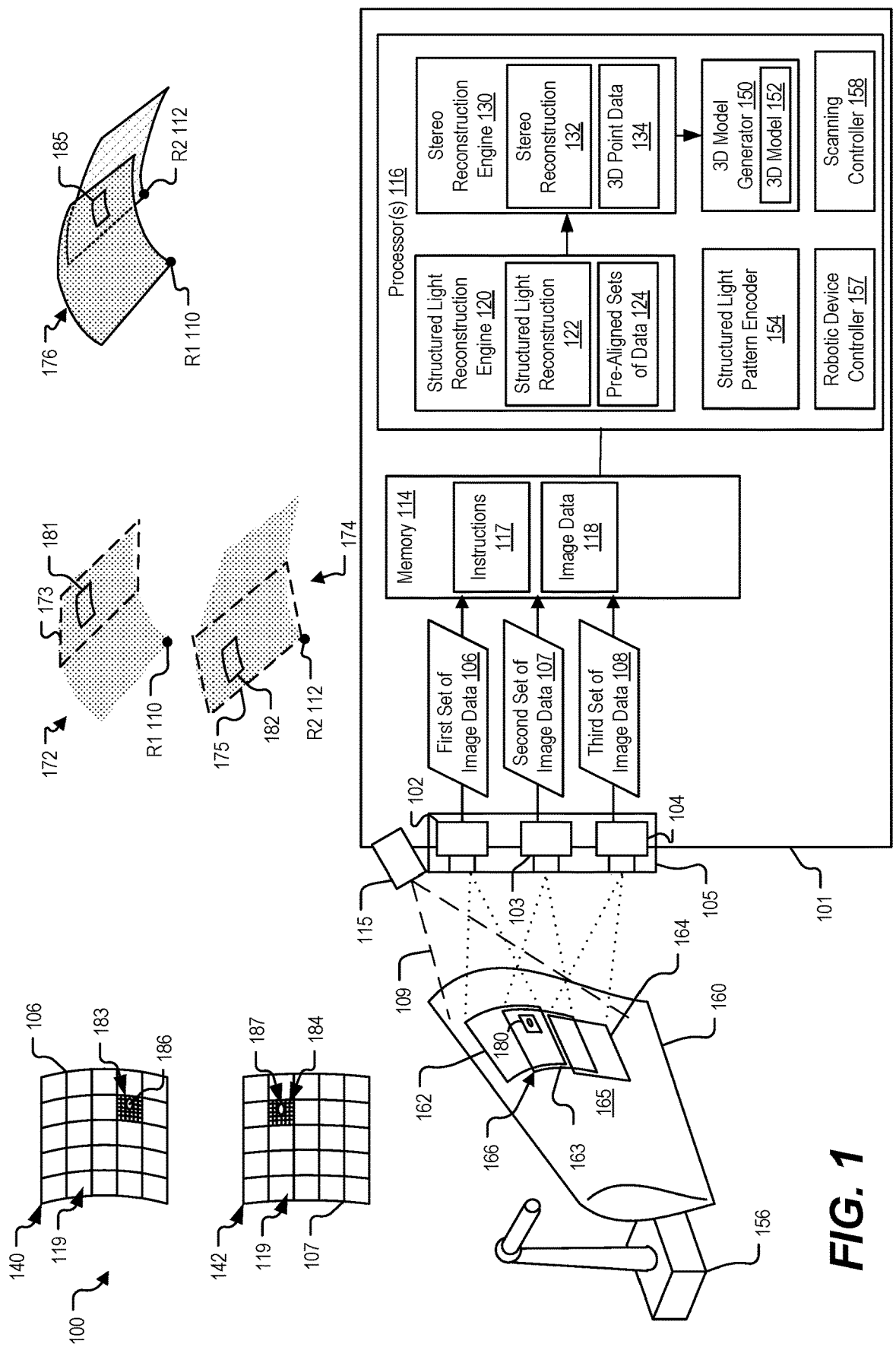
FIG. 1 is a diagram that illustrates an example system including an apparatus configured to generate 3D surface data of a scanned object.

Aspects disclosed herein present systems and methods to generate 3D point data of a surface of an object based on stereo reconstruction using structured light. Traditionally, stereo reconstruction is computationally expensive and has a relatively high rate of false correspondences between images (e.g., incorrectly identifying two different features from multiple images as the same feature), and exhibits reduced performance when the surface has relatively few features or is relatively untextured.

According to aspects disclosed herein, a structured light pattern is projected onto the surface of the object to be scanned. Although conventional structured light techniques enable relatively efficient 3D point generation as compared to stereo reconstruction and are not substantially impaired by surface portions that are substantially devoid of features or texture, the effectiveness of conventional structured light techniques is limited by the resolution of the projector. The relatively low resolution of the projector renders conventional structured light 3D point generation inadequate for surface scanning of relatively large objects in applications that require high accuracy and generation of dense 3D point data. Examples of such surface scanning operations with respect to relatively larger objects with high accuracy requirements include, but are not limited to, verifying tolerances of aircraft surfaces (e.g., a wing or fuselage component of a commercial aircraft) during manufacture.

According to various implementations of the present disclosure, stereo images are taken of the surface. The stereo images represent surface features and portions of a structured light pattern that is projected onto the surface. Image capture of the stereo images by cameras having a higher resolution than the projector resolution results in a group or "bucket" of image pixels for each projected pixel of the structured light pattern that is captured in an image. A coarse image alignment and low-resolution depth information is obtained by performing structured light reconstruction that identifies corresponding projector pixels in each pair of stereo images. For each projected pixel of the structured light pattern identified in the pair of stereo images, stereo reconstruction is performed that more finely aligns image pixels of a first bucket of pixels (corresponding to the projected pixel in a first image of the stereo images) with image pixels of a second bucket of pixels (corresponding to the projected pixel in the second image of the stereo images). In some implementations, a search for corresponding pixels in the stereo images is independently performed for each of the projected pixels, constraining each of the independent correspondence searches to the image pixels in each of the identified buckets of pixels (or in some implementations, also including image pixels in neighboring region of the projected pixel).

Technical effects of various implementations include reduced processing time, processing complexity, processing resources, or combinations thereof, to perform correspondence searches for the stereo reconstruction as compared to performing conventional correspondence searches that span across entire images. Technical effects of various implementations include improved accuracy of a resulting set of 3D point data representing the surface as compared to conventional stereo reconstruction techniques for surface portions that are substantially devoid of features or texture. A technical effect of various implementations is a reduced rate of false correspondences as compared to conventional stereo reconstruction techniques. Another technical effect of various implementations is higher accuracy and resolution of resulting 3D point data as compared to conventional structured light reconstruction techniques.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, surface features are illustrated and associated with reference numbers 240A, 240B, etc. When referring to a particular one of these surface features, such as feature 240A, the distinguishing letter "A" is used. However, when referring to any arbitrary one of these surface features or to these surface features as a group, the reference number 240 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features, and are subsequently referred to in the singular unless aspects related to multiple of the features are being described.

The terms include," "includes," or "including," and "contain," "contains," or "containing," are used interchangeably with "comprise," "comprises," and "comprising," and are intended to be inclusive as an open transition word without precluding any additional or other elements. Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a system 100 is depicted that includes an apparatus 101 configured to perform a 3D scan of an object 160. For clarity of explanation, a first point cloud 172, a second point cloud 174, and a combined point cloud 176 depict illustrative examples of stages of a 3D point generation process at the apparatus 101. The apparatus 101 is configured to capture information regarding the surface 165 of the object 160 as a series of overlapping "patches" (also referred to as "tiles") and to piece together the patches to generate a 3D model 152. Because accuracy of the 3D model 152 is impacted if one or more of the patches is misaligned relative to other patches, alignment or "registration" of the patches is performed to obtain an accurate 3D depiction of the surface 165 of the object 160.

In FIG. 1, the apparatus 101 includes multiple cameras 105 that are configured to capture multiple sets of image data 106-108 and also includes one or more projectors 115. Each projector 115 of the one or more projectors 115 is configured to project structured light 109 to form a structured light pattern 119 on the surface 165. Portions of the structured light pattern 119 are depicted as rectangular arrays of projected pixels that have been distorted due to curvature or depth variation of the surface 165 in a first graphical representation 140 of a first set of image data 106 and in a second graphical representation 142 of a second set of image data 107, as described further below. The structured light pattern 119 includes multiple structured light features or "pixels" that are projected onto the surface 165, such as a representative projected pixel 180. In contrast to an "image pixel," (e.g., a smallest distinct unit of an image taken by a camera), a "projected pixel" is the pattern of light, at a surface, resulting from the projection of a smallest distinct unit of a structured light pattern onto the surface. Representations of the projected pixel 180 are captured in the first set of image data 106 and the second set of image data 107. For example, in the first graphical representation 140 the projected pixel 180 is represented by (e.g., corresponds to) a first group 183 of image pixels, and in the second graphical representation 142 the projected pixel 180 is represented by (e.g., corresponds to) a second group 184 of image pixels.

The multiple cameras 105 are illustrated as a first camera 102, a second camera 103, and a third camera 104 that are configured to perform a 3D scan of the object 160 (e.g., a portion of an aircraft wing) to generate the first set of image data ("first image data") 106, the second set of image data ("second image data") 107, and a third set of image data ("third image data") 108, respectively. The first camera 102 is configured to generate the first image data 106 representing a first portion 162 of the surface 165 of the object 160. The second camera 103 is configured to generate the second image data 107 representing a second portion 163 of the surface 165 of the object 160. The third camera 104 is configured to generate the third image data 108 representing a third portion 164 of the surface 165 of the object 160. The projected pixel 180 is in an overlapping portion 166 of the first portion 162 and the second portion 163.

The apparatus 101 also includes a memory 114 and one or more processors (also referred to as "processor(s)") 116. As described further with reference to FIG. 3, in some implementations the apparatus 101 also includes a movable frame configured to support the cameras 105, the one or more projectors 115, or both, and to transport the cameras 105, the one or more projectors 115, or both, along a length of the object 160 during a scanning operation.

The memory 114 includes a non-transitory, computer-readable medium that is configured to store the multiple sets 106-108 of image data as stored image data 118. Each of the multiple sets 106-108 corresponds to a respective portion 162-164 of the surface 165 of the object 160 and a respective portion of the structured light pattern 119 projected onto the surface 165. The memory 114 also stores instructions 117 that are executable by the processor(s) 116 to perform one or more operations, as described below.

The processor(s) 116 include a structured light reconstruction engine 120, a stereo reconstruction engine 130, a 3D model generator 150, a structured light pattern encoder 154, a robotic device controller 157, and a scanning controller 158. The processor(s) 116 are configured to perform structured light reconstruction 122 of the multiple sets 106-108 and to perform stereo reconstruction 132 of the multiple sets 106-108 to generate three-dimensional (3D) point data 134 of the surface 165 of the object 160. Although only three sets of image data 106-108 are illustrated for ease of explanation, any number of sets of surface data (e.g., thousands of sets) may be generated during a surface scan of the object 160 and processed by the structured light reconstruction engine 120.

To illustrate, the structured light reconstruction engine 120 is configured to perform a structured light reconstruction 122 of pairs of overlapping sets of the sets of image data 106-108 to generate "pre-aligned" sets of data 124, such as described in further detail below and with reference to FIG. 2. The structured light reconstruction 122 includes identifying each group or "bucket" of pixels in the multiple sets of image data 118 that corresponds to each particular projected pixel of the structured light pattern 119 and to align (e.g., generate transformation data to substantially overlap) the groups of pixels from multiple sets of image data that correspond to the same projected pixel. For example, the structured light reconstruction 122 includes matching the first group 183 of image pixels that correspond to the projected pixel 180 of the structured light pattern 119 in the first set 106 of image data with the second group 184 of image pixels that correspond to the projected pixel 180 in the second set 107 of image data to generate a pre-aligned set based on the first set 106 and the second set 107.

In an illustrative example, the structured light reconstruction engine 120 is configured to perform a "coarse," relatively low-resolution alignment of projected pixels in the first image data 106 and the second image data 107 and also to generate depth data associated with the projected pixels to form the first point cloud 172 and the second point cloud 174. For example, the structured light reconstruction engine 120 generates depth data by detecting a deviation of the shape, size, location, or a combination thereof, of the projected pixel 180 in the image data 106, 108 as compared to the shape, size, and/or location that the projected pixel 180 would have if projected onto a uniform flat surface at a predetermined distance from the cameras 105. The structured light reconstruction engine 120 determines a surface variation (e.g., a "depth" variation from the perspective of the cameras 102-104) that accounts for the detected deviation of the shape, size, or location of the projected pixel 180. Additional details of performing the structured light reconstruction 122 are provided with reference to the particular example described in FIG. 2.

The stereo reconstruction engine 130 is configured to perform the stereo reconstruction 132 of the pre-aligned sets 124 to generate the 3D point data 134. In contrast to the "coarse" structured light reconstruction 122, the stereo reconstruction engine 130 provides "fine" alignment and depth determination. To illustrate, the stereo reconstruction 132 includes matching one or more features, such as a representative feature 186 (e.g., an edge, hole, color or texture feature, etc.), detected within the first group 183 of image pixels with one or more features, such a representative feature 187, detected within the second group 184 of image pixels. Because each of the multiple cameras 105 has an image pixel resolution that exceeds a projector pixel resolution of the one or more projectors 115, each of the groups 183, 184 of image pixels includes multiple pixels (e.g., tens, hundreds, thousands, or some other number of pixels) that enable capturing and distinguishing between features in the portion of the surface 165 underlying the projected pixel 180.

In some implementations, the stereo reconstruction 132 restricts a correspondence search that is associated with the projected pixel 180. In a first illustrative example, as described further with reference to FIG. 2, the correspondence search is restricted to exclude pixels in the first set 106 of image data that are outside of the first group 183 of image pixels and to exclude pixels in the second set 107 of image data that are outside of the second group 184 of image pixels. In another illustrative example, as described further with reference to FIG. 2, the stereo reconstruction 132 restricts a correspondence search that is associated with the projected pixel 180 to exclude pixels in the first set 106 of image data that are outside of a first extended group of pixels corresponding to the projected pixel 180 and projected pixels adjacent to the projected pixel 180 and also to exclude pixels in the second set 107 of image data that are outside of a second extended group of pixels corresponding to the projected pixel 180 and projected pixels adjacent to the projected pixel 180. Additional details of performing the stereo reconstruction 132 are provided with reference to the particular implementation described in FIG. 2.

The point clouds 172, 174, and 176 graphically depict a simplified example of generating the 3D point data 134. The structured light reconstruction engine 120 processes the first image data 106 to generate 3D points corresponding to the first portion 162, such as a collection of 3D points that are graphically represented as the first point cloud 172. In an illustrative example, the structured light reconstruction engine 120 combines each image pixel's two-dimensional coordinate location with coarse depth data determined based on detection of the structured light pattern 119 to generate a list of points with three coordinates, such as (x, y, z). Each point in the first point cloud 172 has a position relative to a first reference (R1) 110 (e.g., a reference position and orientation). The structured light reconstruction engine 120 processes the second image data 107 to generate 3D surface data corresponding to the second portion 163, such as a collection of 3D points that are graphically represented as the second point cloud 174, with each point in the second point cloud 174 having a position relative to a second reference (R2) 112.

The first image data 106 and second image data 107 each include a portion that corresponds to the overlap portion 166 of the first portion 162 and the second portion 163. The overlap portion 166 includes multiple projected pixels of the structured light pattern 119, such as a representation 181 of the projected pixel 180 in the first image data 106 and a representation 182 of the projected pixel 180 in the second image data 107 (illustrated in the first point cloud 172 and the second point cloud 174, respectively). The representations 181, 182 of the projected pixel 180 are used to perform an alignment with reference to the first image data 106 and the second image data 107, illustrated as an overlap portion 173 of the first point cloud 172 and an overlap portion 175 of the second point cloud 174. In the illustrative example, the first point cloud 172 and the second point cloud 174 are oriented and positioned relative to each to substantially align the representation 181 with the representation 182, illustrated as an aligned representation 185 of the projected pixel 180 in the combined point cloud 176. After the structured light reconstruction 122, the stereo reconstruction 132 further refines alignment and depth information based on matching features (e.g., the features 186 and 187) of each of the projected pixels, as described further with reference to FIG. 2.

The resulting 3D point data 134 includes a set of points generated from the combined sets of image data 118, including depth information, representing 3D coordinates of points on the surface 165 of the object 160. The processor(s) 116 are further configured to generate a 3D model 152 of the object 160 based on the 3D point data 134. To illustrate, the 3D model generator 150 is configured to receive the 3D point data 134 and to generate the 3D model 152 of the object 160. In some implementations, the 3D model 152 is used in one or more fabrication processes or design processes, such as for quality control (e.g., comparing the 3D model 152 to a reference model to locate defects), visualization, robotic control, or simulation, as illustrative, non-limiting examples. In a particular example, the 3D model 152 is provided to a robotic device 156 for use in an operation on the object 160, and the robotic device 156 is controlled to interact with the object 160 based on the 3D model 152. In an illustrative example, the 3D model 152 is input to the robotic device controller 157 that executes a robot path planning operation to create instructions to guide the robotic device 156 on a path along the surface 165 while maintaining a given distance from the surface 165 at all times. In another illustrative example, the robotic device 156 is instructed to go to particular positions on the surface 165 and perform some task, e.g., insert a rivet. As illustrated, the object 160 is a component of an aircraft and the robotic device 156 includes a robotic spray painter. The robotic device 156 is operative to perform precise application of paint to the surface 165 of the object 160 in accordance with the modeled surface of the object 160 provided by the 3D model 152.

The structured light pattern encoder 154 is configured to determine the structured light pattern 119 for projection onto the surface 165. In some implementations, the structured light pattern encoder 154 is configured to encode pixel identification information into the structured light pattern 119 to enable identification of each structured light pixel in the sets of image data 106-108. In an illustrative example, the structured light pattern 119 is encoded in the time domain. Although the structured light pattern 119 is illustrated as a rectangular array of pixels for clarity of explanation, in other implementations the structured light pattern 119 includes other arrangements of structured light features (e.g., a regular or irregular arrangement of pixels, such as for periodic or aperiodic tiling across the surface, as an illustrative, non-limiting example).

The stereo reconstruction 132 based on the structured light reconstruction 122 that is performed by the apparatus 101 enables accurate alignment and generation of high-resolution depth data from the sets of image data 106-108 using relatively limited processing resources. The structured light reconstruction 122 generates a coarse alignment and depth data based on matching projected pixels in overlapping images and determining a distortion to the projected pixels indicative of distance variation from the cameras 105. The structured light reconstruction 122 provides a starting condition for the stereo reconstruction engine 130 to generate a fine alignment and higher-resolution depth data using a reduced amount of processing resources as compared to conventional stereo reconstruction techniques. Using the structured light pattern 119 to constrain the number of pixels for correspondence searches based on the projected pixels, enables the 3D point data 134 used to generate the 3D model 152 to be generated at higher speed and reduced cost, and with enhanced accuracy, as compared to conventional techniques.

Although only three portions of the surface 165 of the object 160, e.g., first portion 162, second portion 163, and third portion 164, are illustrated, it should be understood that in some implementations the apparatus 101 is configured to scan all (or substantially all) of the surface 165 of the object 160 using multiple overlapping patches to generate a full scan of the surface 165 of the object 160. Although three cameras 102-104 are illustrated, in other implementations the apparatus 101 includes two cameras, or more than three cameras. In a particular implementation, the apparatus 101 includes a single camera that is moved to capture different images, e.g., instead of having multiple cameras. In some implementations, the multiple cameras 105, the one or more projectors 115, and the scanning controller 158 are omitted, and the structured light reconstruction engine 120 and the stereo reconstruction engine 130 process image data that is received via another source, such as surface stereo image data received from a remote structured light image scanner. In some implementations, the structured light pattern encoder 154 is omitted, such as implementations in which data enabling generation of one or more structured light patterns is retrievable from the memory 114 or another storage device to be accessible to the one or more projectors 115. In some implementations, the apparatus 101 omits the robotic device controller 157, such as an implementation in which the 3D model 152 is transmitted to an external controller of the robotic device 156.

Although the structured light reconstruction engine 120, the stereo reconstruction engine 130, the 3D model generator 150, the structured light pattern encoder 154, the robotic device controller 157, and the scanning controller 158 are depicted as separate components, in other implementations the described functionality of two or more of the structured light reconstruction engine 120, the stereo reconstruction engine 130, the 3D model generator 150, the structured light pattern encoder 154, the robotic device controller 157, and the scanning controller 158 are performed by a single component. In some implementations, one or more, or each, of the structured light reconstruction engine 120, the stereo reconstruction engine 130, the 3D model generator 150, the structured light pattern encoder 154, the robotic device controller 157, and the scanning controller 158 is represented in hardware, such as via an application-specific integrated circuit (ASIC) or a field-programmable gate array (FPGA).

Figure 2:
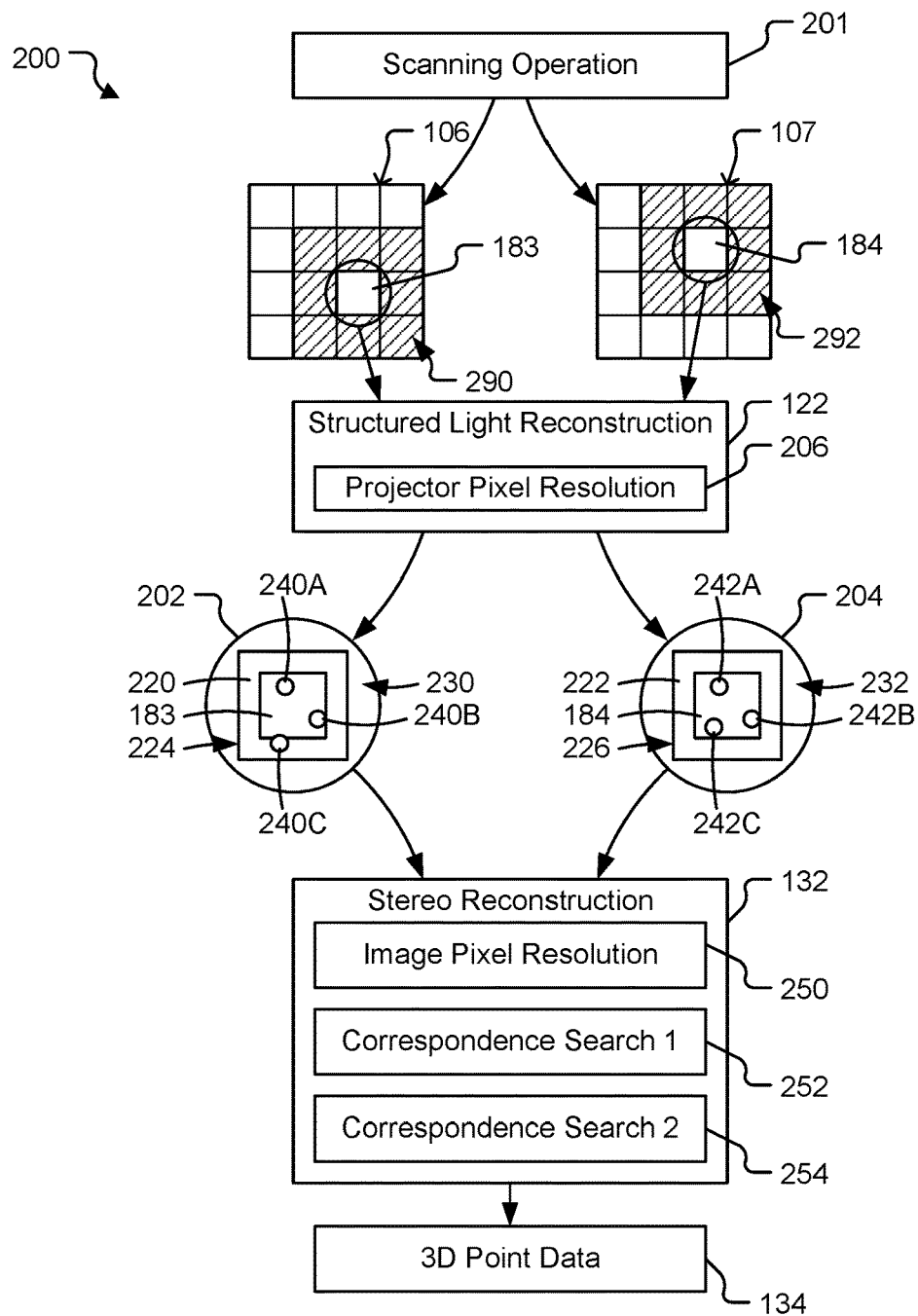
FIG. 2 is a diagram that illustrates a particular example of operation of the apparatus of FIG. 1.

FIG. 2 depicts an illustrative example of operation of the apparatus 101 of FIG. 1. A scanning operation 201 is performed, such as by the scanning controller 158 coordinating structured light projection, image capture, and movement of the apparatus 101 relative to the surface 165 of the object 160, to generate the image data 118 that includes multiple sets of image data depicting overlapping portions of the surface 165. For example, the first image data 106 and the second image data 107 collectively contain stereo image data of the overlapping portion 166, including respective representations of the projected pixel 180. A simplified depiction of the first image data 106 illustrates a portion of the structured light pattern 119, including the first group 183 of image pixels corresponding to the projected pixel 180 and also including image pixels corresponding to projected pixels 290 adjacent to the projected pixel 180. A simplified depiction of the first image data 106 illustrates another (partially overlapping) portion of the structured light pattern 119, including the second group 184 of image pixels corresponding to the projected pixel 180 and also including image pixels corresponding to projected pixels 292 adjacent to the projected pixel 180.

The structured light reconstruction 122 preforms coarse alignment of portions of the first image data 106 and the second image data 107, in addition to generating coarse depth data, based on detected projected pixels of the structured light pattern 119. Because the structured light reconstruction 122 matches representations of projected pixels in the first image data 106 with corresponding representations of the projected pixels in the second image data 107, in some implementations the structured light reconstruction 122 is limited by a projector pixel resolution 206 (e.g., a smallest feature size of the structured light pattern 119 of the surface 165 of the object 160).

The stereo reconstruction engine 130 operates to perform the stereo reconstruction 132 by matching surface features detected within each pair of stereo images of the image data 118. In an illustrative example, the stereo reconstruction 132 includes, for each projected pixel of the structured light pattern 119, scanning the image data 118 to locate individual sets of image data that include captured representations of that projected pixel and matching features of the surface 165 that coincide with (e.g., are projected upon by) that projected pixel.

As an illustrative example, a first portion 202 of the first image data 106 and a second portion 204 of the second image data 107 are determined to be portions of the image data 118 that include representations of the projected pixel 180. The first portion 202 includes image pixels in the first group 183, neighboring pixels 220 that are outside of the first group 183 and that are adjacent to (e.g., within a predefined distance of) the first group 183, and pixels 230 that are outside of the first group 183 and outside of the neighboring pixels 220. The neighboring pixels 220 correspond to the projected pixels 290 adjacent to the projected pixel 180. In some implementations, the neighboring pixels 220 include all pixels of the first image data 106 that coincide with the projected pixels 290 adjacent to the projected pixel 180. In other implementations, the neighboring pixels 220 include a subset of the pixels of the first image data 106 that coincide with the projected pixels 290 adjacent to the projected pixel 180. The first portion 202 also includes representations of detected features 240 of the surface 165 in the vicinity of the projected pixel 180, including features 240A and 240B detected within the first group 183 and a feature 240C detected partially within the first group 183 and partially within the neighboring pixels 220.

The second portion 204 includes image pixels in the second group 184, neighboring pixels 222 that are outside of the second group 184 and that are adjacent to (e.g., within a predefined distance of) the second group 184, and pixels 232 that are outside of the second group 184 and outside of the neighboring pixels 222. The neighboring pixels 222 correspond to the projected pixels 292 adjacent to the projected pixel 180 in a similar manner as described with reference to the neighboring pixels 220. The second portion 204 also includes representations of detected features 242 of the surface 165 in the vicinity of the projected pixel 180, including features 242A, 242B, and 242C detected within the second group 184.

The stereo reconstruction 132 includes performing one or more correspondence searches to find surface features detected in the second portion 204 to correspond to surface features detected in the first portion 202. Such correspondence searches are restricted to image pixels in the respective portions 202, 204 rather than being applied to all image pixels in the first image data 106 and the second image data 107. In a first example, the stereo reconstruction 132 restricts a first correspondence search 252 that is associated with the projected pixel 180. The correspondence search 252 is restricted to exclude pixels (e.g., the neighboring pixels 220 and the pixels 230) in the first set 106 of image data that are outside of the first group 183 of image pixels and to exclude pixels (e.g., the neighboring pixels 222 and the pixels 232) in the second set 107 of image data that are outside of the second group 184 of image pixels. The first correspondence search 252 determines that the feature 240A detected in the first image data 106 corresponds to the feature 242A detected in the second image data 107 and that the feature 240B detected in the first image data 106 corresponds to the feature 242B detected in the second image data 107. Because the feature 240C is only partially within the first group 183, the correspondence search 252 associated with the projected pixel 180 does not find sufficient similarity with the matching feature 242C in the second image data 107 to determine that the feature 240C corresponds to the feature 242C.

In a second example, the stereo reconstruction 132 restricts a second correspondence search 254 that is associated with the projected pixel 180 to exclude the pixels 230 in the first set 106 of image data that are outside of a first extended group 224 of pixels and to exclude the pixels 232 in the second set 107 of image data that are outside of a second extended group 226 of pixels. The first extended group 224 of pixels includes the first group 183 and the neighboring pixels 220, corresponding to the projected pixel 180 and to projected pixels 290 adjacent to the projected pixel 180, respectively. The second extended group 226 of pixels includes the second group 184 and the neighboring pixels 220, corresponding to the projected pixel 180 and to projected pixels 292 adjacent to the projected pixel 180, respectively. The second correspondence search 254 determines that the feature 240A corresponds to the feature 242A the feature 240B corresponds to the feature 242B, and that the feature 240C corresponds to the feature 242C.

In some implementations, the stereo reconstruction 132 performs one of the first correspondence search 252 or the second correspondence search 254 and omits the other of the first correspondence search 252 or the second correspondence search 254. In a first illustrative example, because the first correspondence search 252 operating on a smaller group of pixels enables faster feature matching as compared to the second correspondence search 254, the second correspondence search 254 is omitted to reduce a latency associated with the stereo reconstruction 132. In a second illustrative example, because the second correspondence search 254 operating a larger group of pixels enables matching of a larger overall number of features as compared to the first correspondence search 252 (e.g., the first correspondence search 252 fails to match the feature 240C with the feature 242C), the first correspondence search 252 is omitted to increase an overall number of matching features detected in the stereo reconstruction 132.

In some implementations, the second correspondence search 254 is selectively performed based on a result of the first correspondence search 252. In an example, the second correspondence search 254 is bypassed for a particular projected pixel responsive to a number of matching features determined by the first correspondence search 252 for that projected pixel equaling or exceeding a threshold number of features, and the second correspondence search 254 is performed responsive to the number of matching features determined by the first correspondence search 252 for that projected pixel being less than a threshold number of features. In some implementations, selection of the first correspondence search 252 or the second correspondence search 254, a number of pixels to include in the first extended group 224, a number of pixels to include in the second extended group 226, or any combination thereof, is based on an estimated or measured feature density of the surface. In an illustrative, non-limiting example, the stereo reconstruction 132 performs the first correspondence search 252 for surfaces determined to have a relatively high feature density, performs the second correspondence search 254 using relatively small extended groups 224, 226 for surfaces determined to have a moderate feature density, and performs the second correspondence search 254 using relatively large extended groups 224, 226 for surfaces determined to have a relatively low feature density.

The correspondence searches 252, 254 enable generation of the 3D point data 134 having a higher accuracy as compared to the structured light reconstruction 122 because an image pixel resolution 250 of the multiple cameras 105 that generate the image data 118 exceeds (i.e., has a higher resolution than) the projector pixel resolution 206 of the one or more projectors 115.

Figure 3:
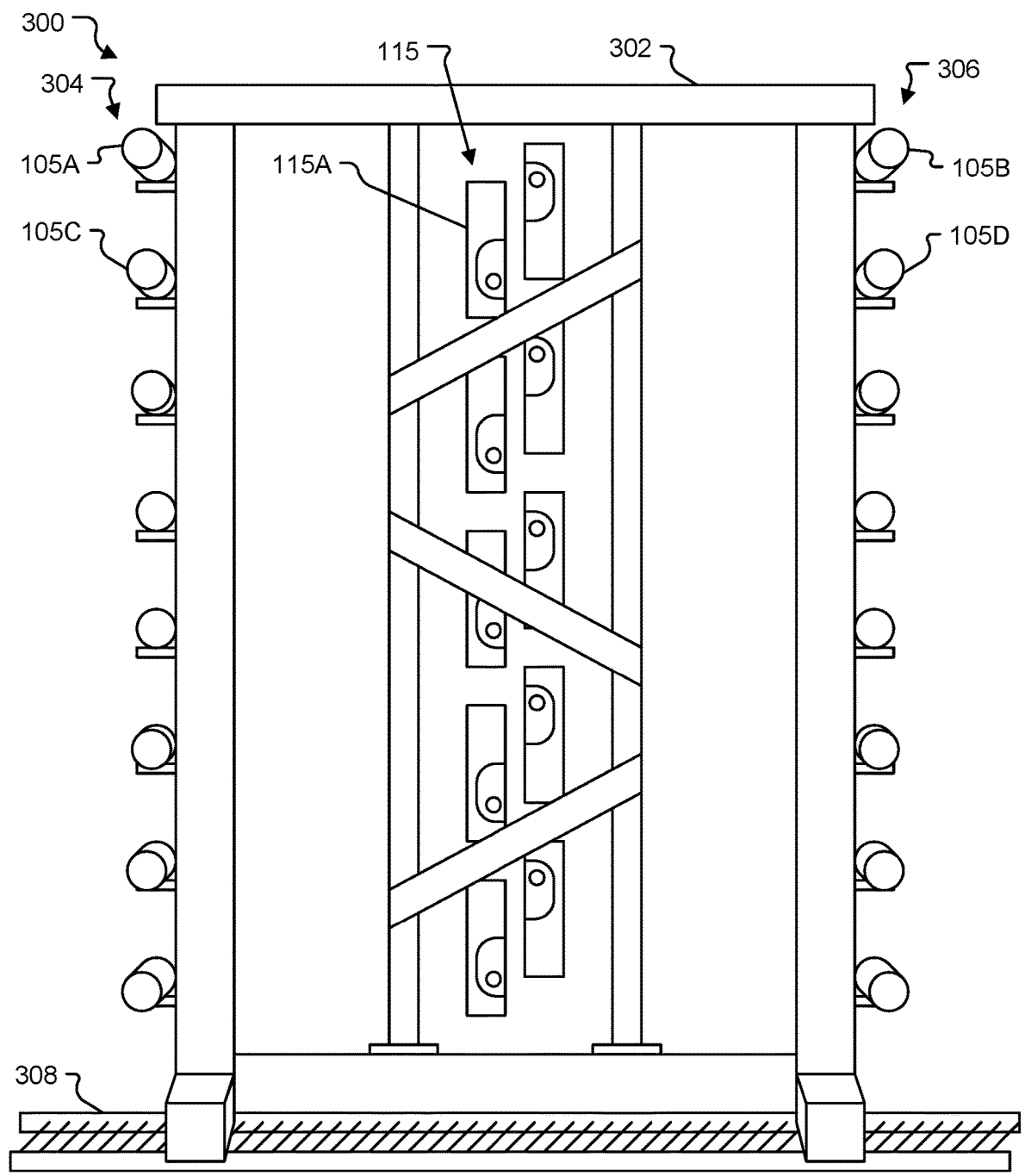
FIG. 3 is a diagram that illustrates an example implementation of the apparatus of FIG. 1.

FIG. 3 depicts an illustrative implementation 300 of the apparatus 101 that includes a movable frame 302 configured to support the cameras 105 and the projectors 115 and to transport the cameras 105 and the projectors 115 along a length of an object during a scanning operation. The frame 302 is configured to move along a track 308 (e.g., a set of rails) to enable scanning along a length of a relatively large object, such as an aircraft wing.

As illustrated, a first group 304 of the cameras 105 are attached to one side of the frame 302 and a second group 306 of the cameras 105 are attached to an opposite side of the frame 302. The cameras 105 are positioned and oriented so that field of view of each of the cameras 105 overlaps the field of view of at least another of the cameras 105 during the scanning operations so that each point of the surface of an object is captured by at least two cameras 105 during the scanning operation. For example, a field of view of a first camera 105A in the first group 304 at least partially (or completely) overlaps with a field of view of a second camera 105B in the second group 306, and a field of view of a third camera 105C in the first group 304 at least partially (or completely) overlaps with a field of view of a fourth camera 105D in the second group 306. In addition, the field of view of the first camera 105A at least partially overlaps with the field of view of the third camera 105C, and the field of view of the second camera 105B at least partially overlaps with the field of view of the fourth camera 105D.

The projectors 115 are positioned and oriented so that each projector 115, such as a representative projector 115A, projects a portion of the structured light pattern 119 onto a surface being scanned. Using multiple projectors 115 enables a relatively large portion of the surface to be illuminated with the structured light pattern 119 with a higher projector pixel resolution as compared to using fewer projectors (or a single projector) to project a structured light pattern onto the same portion of the surface.

In some implementations, the frame 302 is repeatedly re-positioned along the track 308. To illustrate, a structured light projection and image capture operation is performed on a first portion of an object while the frame 302 is at one position on the track 308, and the frame 302 is moved to another position along the track 308 to repeat the structured light projection and image capture operation on another portion of the object. In other implementations, the frame 302 is continuously moved along the track 308 and structured light projection and image capture operation is performed when the frame 302 at predetermined positions along the track 308. In an illustrative example, the projectors 115 continually project structured light and the cameras 105 perform periodic image capture operations based on a duration of elapsed time since a most recent image capture operation, based on a distance travelled since the most recent image capture operation, or a combination thereof. In another illustrative example, the cameras 105 perform continuous video capture as the frame 302 moves along the track 308, and still images generated from the captured video are selected for use as the image data 118.

In some implementations, operation of each of the projectors 115 and each of the cameras 105 is substantially concurrent (e.g., simultaneous) for each position of the frame 302 along the length of the object being scanned (e.g., an entire "vertical" slice of the object is captured at one time for each position of the frame 302. In other implementations, a sequence of projector operation and camera operation is performed, such as to perform a sequential top-to-bottom scan, a sequential bottom-to-top scan, or an interleaved or partially parallel bottom-to-top or top-to-bottom scan of each portion of the object, as illustrative, non-limiting examples. In some implementations, coordination of movement of the frame 302, operation of each of the projectors 115, and operation of each of the cameras 105 is controlled by the scanning controller 158 of FIG. 1.

Although the implementation 300 includes the frame 302 configured to move along the track 308 (e.g., including rollers or wheels to engage one or more rails of the track 308), in other implementations the track 308 is omitted. As an example, in some implementations the frame 302 is fastened to a chassis including wheels and a steering mechanism to enable the frame 302 to move along a factory floor or other surface. As another example, in some implementations the frame 302 remains substantially immobile during a scanning operation and the scanned object is moved relative to the frame 302.

Figure 4:
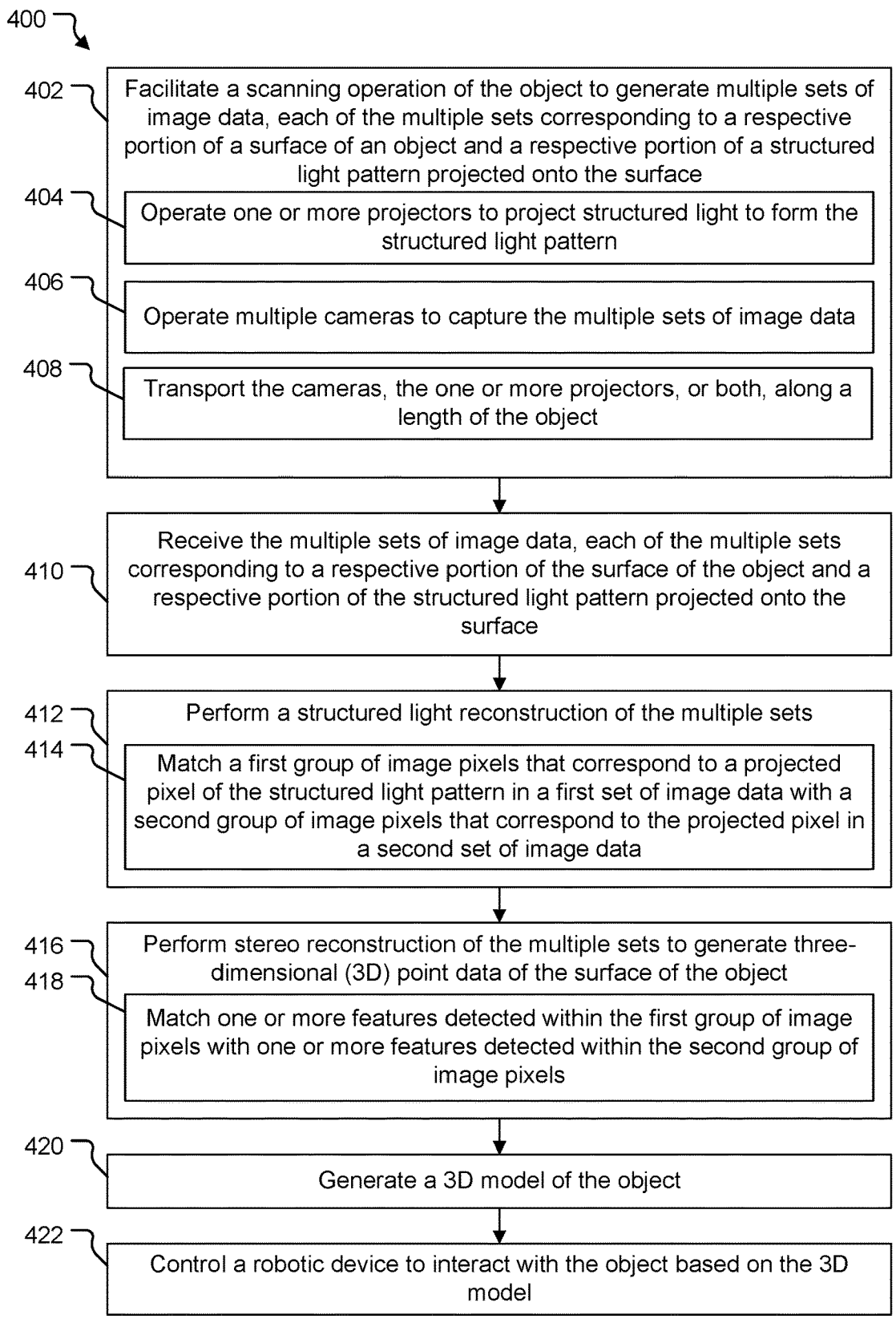
FIG. 4 is a diagram that illustrates a flow chart of an example of a method of generating 3D surface data that may be performed by the apparatus of FIG. 1.

FIG. 4 depicts an example of a method 400 of generating three-dimensional point data based on stereo reconstruction using structured light. In a particular example, the method 400 is performed by the apparatus 101 of FIG. 1.

The method 400 includes, at 402, facilitating a scanning operation of an object to generate multiple sets of image data. Each of the multiple sets corresponds to a respective portion of a surface of an object and a respective portion of a structured light pattern projected onto the surface. In an example, the scanning controller 158 of FIG. 1 is executed to control the scanning operation 201 of FIG. 2 to generate the sets 106-108 of image data corresponding to the surface 165 of the object 160. In an illustrative example, the object includes a component of an aircraft, such as illustrated in FIG. 5B.

The scanning operation includes, at 404, operating one or more projectors to project structured light to form the structured light pattern, such as the projector(s) 115 that project the structured light 109 to form the structured light pattern 119. The scanning operation includes, at 406, operating multiple cameras to capture the multiple sets of image data, such as the multiple cameras 105 to capture the sets 106-108. In an example, each of the multiple cameras has an image pixel resolution (e.g., the image pixel resolution 250) that exceeds a projector pixel resolution (e.g., the projector pixel resolution 206) of the one or more projectors 115. The scanning operation 201 further includes, at 408, transporting the cameras 105, the one or more projectors 115, or both, along a length of the object 160.

The method 400 includes, at 410, receiving the multiple sets of image data. For example, the memory 114 receives the sets 106-108 of image data from the cameras 105. Each of the multiple sets corresponds to a respective portion of the surface of the object and a respective portion of the structured light pattern projected onto the surface.

The method 400 includes, at 412, performing a structured light reconstruction of the multiple sets, such as the structured light reconstruction 122 of the sets 106-108. The structured light reconstruction includes, at 414, matching a first group 183 of image pixels that correspond to a projected pixel 180 of the structured light pattern 119 in a first set 106 of image data with a second group 184 of image pixels that correspond to the projected pixel 180 in a second set 107 of image data. In an example, the first group 183 of image pixels that correspond to the projected pixel 180 of the structured light pattern 119 in the first set 106 are matched with the second group 184 of image pixels that correspond to the projected pixel 180 in the second set 107 of image data.

The method 400 includes, at 416, performing stereo reconstruction of the multiple sets to generate 3D point data of the surface of the object, such as the stereo reconstruction 132 to generate the 3D point data 134 of the surface 165 of the object 160. The stereo reconstruction includes, at 418, matching one or more features detected within the first group of image pixels with one or more features detected within the second group of image pixels, such as matching the feature 186 or the features 240 detected within the first group 183 with one or more of the feature 187 or the features 242, respectively, detected within the second group 184 of image pixels. In some implementations, the stereo reconstruction restricts a correspondence search that is associated with the projected pixel. In an example, the correspondence search is restricted to exclude pixels in the first set of image data that are outside of the first group of image pixels and to exclude pixels in the second set of image data that are outside of the second group of image pixels, such as described with reference to the correspondence search 252 of FIG. 2. In another example, the correspondence search is restricted to exclude pixels in the first set of image data that are outside of a first extended group of pixels that corresponds to the projected pixel and to projected pixels adjacent to the projected pixel and to exclude pixels in the second set of image data that are outside of a second extended group of pixels that corresponds to the projected pixel and to projected pixels adjacent to the projected pixel, such as described with reference to the correspondence search 254 of FIG. 2.

The method 400 includes, at 420, after generating the 3D point data, generating a 3D model of the object, such as the 3D model 152. The method 400 also includes, at 422, controlling a robotic device, such as the robotic device 156, to interact with the object based on the 3D model.

In some implementations, the method 400 is performed by multiple interoperating devices or systems. In some examples, the scanning operation is performed remotely from the 3D point generation, such as at a remote manufacturing site, and the multiple sets of image data are transmitted to the processor(s) 116, such as at a cloud computing center. In some examples, the 3D point data is transmitted to a remote 3D model generator, the 3D model is transmitted to a remote robotic device controller, or a combination thereof. However, in other implementations, every element of the method 400 is performed by a single entity, such as described with reference to the apparatus 101 of FIG. 1. In some implementations, the method 400 is performed in multiple stages separated by an extended time span. In an illustrative example, after scanning the object, the multiple sets of image data are stored for later retrieval and processing. Similarly, after generating the 3D point data, the 3D point data, the 3D model, or a combination thereof, is stored for later retrieval and processing, such as to control the robotic device during a subsequent stage of a manufacturing process.

In some implementations, one or more elements of the method 400 are omitted. As an illustrative, non-limiting example, in an implementation in which the cameras and the structured light projector(s) are located remotely or retrieved from remote storage, operations associated with blocks 402-408 are omitted from the method 400. In another illustrative, non-limiting example, in an implementation in which the 3D model generation and control of the robotic device are performed remotely, or performed at a later time based on stored 3D point data, operations associated with blocks 420 and 422 are omitted from the method 400.

Figure 5A:
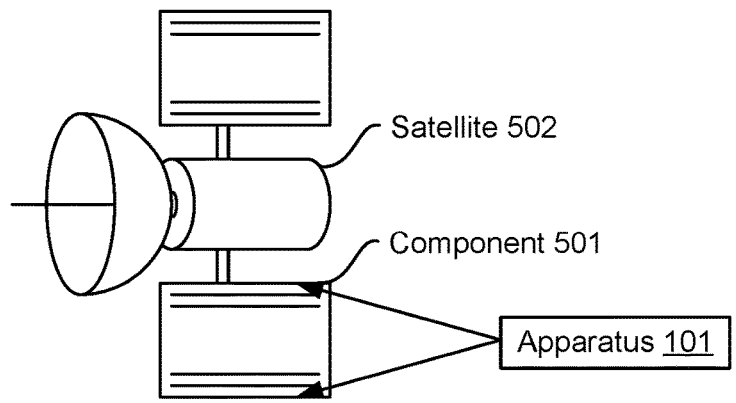
FIG. 5A is a diagram that illustrates a particular example of the apparatus of FIG. 1 performing a scanning operation of a component of a spacecraft.
Figure 5B:
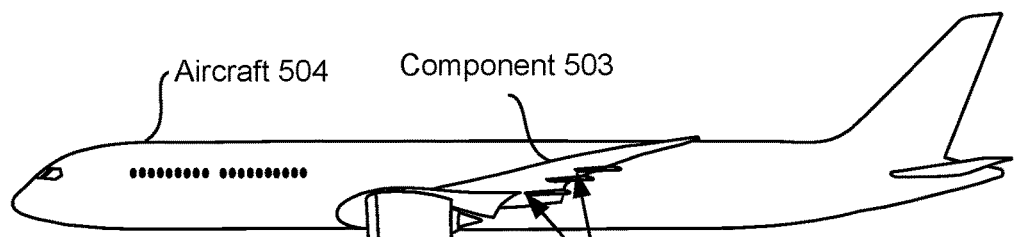
FIG. 5B is a diagram that illustrates a particular example of the apparatus of FIG. 1 performing a scanning operation of a component of an aircraft.
Figure 5C:
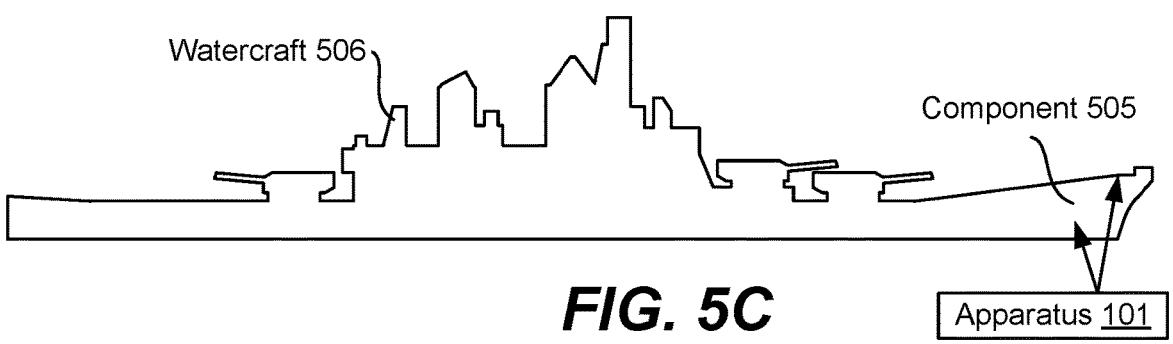
FIG. 5C is a diagram that illustrates a particular example of the apparatus of FIG. 1 performing a scanning operation of a component of a watercraft.

FIGS. 5A-5C depicts multiple examples of systems that include the apparatus 101 operating to generate 3D point data of the object 160 in various implementations. FIG. 5A depicts the apparatus 101 performing a scanning operation of a component 501 (e.g., a solar panel) of a spacecraft, such as a satellite 502. FIG. 5B depicts the apparatus 101 performing a scanning operation of a component 503 (e.g., a wing) of an aircraft 504. FIG. 5C depicts the apparatus 101 performing a scanning operation of a component 505 (e.g., a hull) of a watercraft 506. Although particular components are depicted for clarity of illustration, implementations of the present disclosure are not limited to the illustrated examples. For example, in other implementations the component 503 of the aircraft 504 corresponds to a wing spar, a control surface, a fuselage panel, or one or more other components of the aircraft 504, or any combination thereof.

Although FIGS. 5A-5C depict scanning of vehicle components at the respective vehicles 502, 504, and 506, in other implementations the apparatus 101 operates on components other than in vehicles. For example, in some implementations the apparatus 101 is used to generate 3D data of components that are implemented at a stationary structure (e.g., a mold, mandrel, or other workpiece, as illustrative, non-limiting examples).

Figure 6:
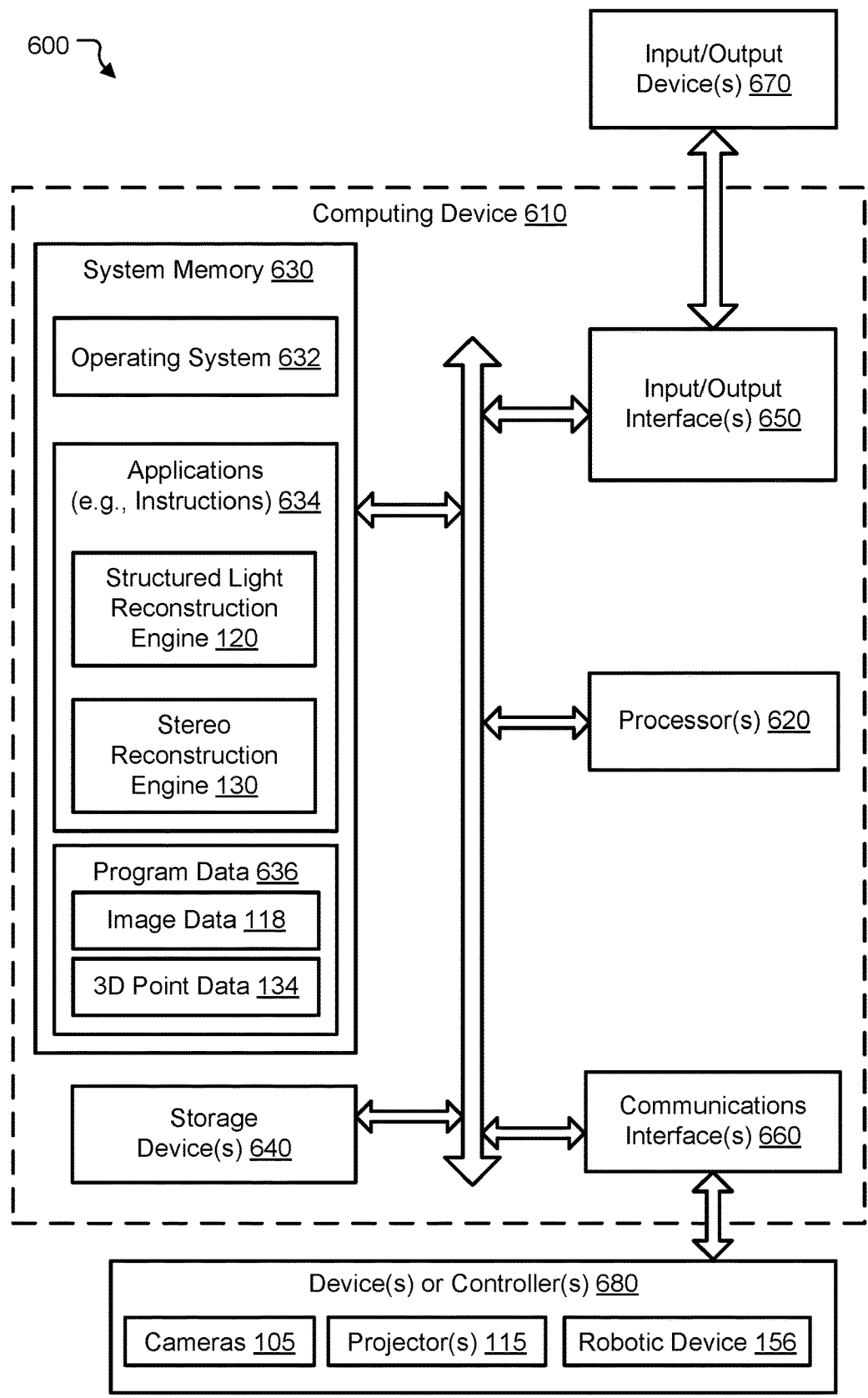
FIG. 6 is a block diagram of a computing environment including a computing device configured to support aspects of computer-implemented methods and computer-executable program instructions (or code) according to the present disclosure.

FIG. 6 is a block diagram of a computing environment 600 including a computing device 610 configured to support aspects of computer-implemented methods and computer-executable program instructions (or code) according to the present disclosure. For example, the computing device 610, or portions thereof, is configured to execute instructions to initiate, perform, or control one or more operations described with reference to FIGS. 1-5C. In a particular implementation, the computing device 610 corresponds to one or more components of the apparatus 101 of FIG. 1.

The computing device 610 includes one or more processors 620. In a particular implementation, the one or more processors 620 correspond to the processor(s) 116 of FIG. 1. The processor(s) 620 are configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 stores system (program) data 636, such as the image data 118 and the 3D point data 134 of FIG. 1.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1-5C. To illustrate, the one or more applications 634 include the structured light reconstruction engine 120 and the stereo reconstruction engine 130 of FIG. 1.

In a particular implementation, the system memory 630 corresponds to the memory 114 and includes a non-transitory, computer-readable medium storing the instructions that, when executed by the processor(s) 620, cause the processor(s) 620 to initiate, perform, or control operations to generate 3D data based on stereo reconstruction of image data using structured light to restrict correspondence searching for the stereo reconstruction. The operations include receiving multiple sets of image data (e.g., the sets 106-108), each of the multiple sets corresponding to a respective portion of a surface of an object (e.g., the surface 165 of the object 160) and including a respective portion of a structured light pattern (e.g., the structured light pattern 119) projected onto the surface. The operations include performing a structured light reconstruction (e.g., the structured light reconstruction 122) of the multiple sets, where the structured light reconstruction includes matching a first group of image pixels (e.g., the first group 183) that correspond to a projected pixel of the structured light pattern in a first set of image data with a second group (e.g., the second group 184) of image pixels that correspond to the projected pixel in a second set of image data. The operations also include performing stereo reconstruction (e.g., the stereo reconstruction 132) of the multiple sets to generate 3D point data of the surface of the object, where the stereo reconstruction includes matching one or more features detected within the first group of image pixels with one or more features detected within the second group of image pixels.

In some implementations, the one or more storage devices 640 include nonvolatile storage devices, such as magnetic disks, optical disks, or flash memory devices. In a particular example, the storage devices 640 include both removable and non-removable memory devices. The storage devices

640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 enable the computing device 610 to communicate with one or more input/output devices 670. In some implementations the one or more input/output interfaces 650 include a display interface, an input interface, or both. For example, the input/output interface 650 is adapted to receive input from a user, to receive input from another computing device, or a combination thereof. In some implementations, the input/output interface 650 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 670 includes one or more user interface devices and displays including some combination of buttons, keyboards, pointing devices, displays, speakers, microphones, touch screens, and other devices.

The processor(s) 620 are configured to communicate with devices or controllers 680, such as the multiple cameras 105, the one or more projectors 115, and the robotic device 156, via the one or more communications interfaces 660. In an example, the one or more communications interfaces 660 includes a network interface or other interface device, one or more other devices, or any combination thereof.

In conjunction with the described systems and methods, an apparatus for generating 3D point data of a surface of an object is disclosed that includes means for receiving multiple sets of image data, each of the multiple sets corresponding to a respective portion of a surface of an object and comprising a respective portion of a structured light pattern projected onto the surface. In an illustrative example, the means for receiving multiple sets of image data includes the memory 114, the processor(s) 116, the structured light reconstruction engine 120, one or more other structures or devices configured to receive the multiple sets of image data, or any combination thereof.

The apparatus includes means for performing a structured light reconstruction of the multiple sets, where the structured light reconstruction comprises matching a first group of image pixels that correspond to a projected pixel of the structured light pattern in a first set of image data with a second group of image pixels that correspond to the projected pixel in a second set of image data. In an illustrative example, the means for performing the structured light reconstruction includes the processor(s) 116, the structured light reconstruction engine 120, one or more other structures or devices configured to perform the structured light reconstruction, or any combination thereof.

The apparatus includes means for performing stereo reconstruction of the multiple sets to generate three-dimensional (3D) point data of the surface of the object, where the stereo reconstruction comprises matching one or more features detected within the first group of image pixels with one or more features detected within the second group of image pixels. In an illustrative example, the means for performing the stereo reconstruction includes the processor(s) 116, the stereo reconstruction engine 130, one or more other structures or devices configured to perform the stereo reconstruction, or any combination thereof.

In some implementations, a non-transitory, computer-readable medium stores instructions that, when executed by a processor, cause the processor to initiate, perform, or control operations to perform part or all of the functionality described above. For example, the instructions may be executable to implement one or more of the operations or methods of FIGS. 1-6. In some implementations, part or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Further, the disclosure comprises embodiments according to the following clauses:

Clause 1. An apparatus (101), comprising:

a memory (114) configured to store multiple sets (106-108) of image data, each of the multiple sets (106-108) corresponding to a respective portion (162-164) of a surface (165) of an object (160) and a respective portion of a structured light pattern (119) projected onto the surface (165); and one or more processors (116) configured to:

perform structured light reconstruction (122) of the multiple sets (106-108), wherein the structured light reconstruction (122) comprises matching a first group (183) of image pixels that correspond to a projected pixel (180) of the structured light pattern (119) in a first set (106) of image data with a second group (184) of image pixels that correspond to the projected pixel (180) in a second set (107) of image data; and perform stereo reconstruction (132) of the multiple sets to generate three-dimensional (3D) point data (134) of the surface (165) of the object (160), wherein the stereo reconstruction (132) comprises matching one or more features (186, 240) detected within the first group (183) of image pixels with one or more features (187, 242) detected within the second group (184) of image pixels.

Clause 2. The apparatus of any one of Clause 1, the one or more processors (116) further configured to generate a 3D model (152) of the object (160) based on the 3D point data (134).

Clause 3. The apparatus of Clause 1 or Clause 2, further comprising:

multiple cameras (105) configured to capture the multiple sets of image data (106-108); and one or more projectors (115), each projector (115) configured to project structured light (109) to form the structured light pattern (119).

Clause 4. The apparatus of Clause 3, wherein each of the multiple cameras (105) has an image pixel resolution (250) that exceeds a projector pixel resolution (206) of the one or more projectors (115).

Clause 5. The apparatus of Clause 4, further comprising a movable frame (302) configured to support the cameras (105), the one or more projectors (115), or both, and to transport the cameras (105), the one or more projectors (115), or both, along a length of the object (160) during a scanning operation (201).

Clause 6. The apparatus of any one of Clauses 1 to 5, wherein the structured light pattern (119) is encoded in the time domain.

Clause 7. The apparatus of any one of Clauses 1 to 6, wherein the object (160) comprises a component (503) of an aircraft (504).

Clause 8. The apparatus of any one of Clauses 1 to 7, wherein the stereo reconstruction (132) restricts a correspondence search (252) that is associated with the projected pixel (180), wherein the correspondence search (252) is restricted to exclude pixels (220, 230) in the first set (106) of image data that are outside of the first group (183) of image pixels and to exclude pixels (222, 232) in the second set (107) of image data that are outside of the second group (184) of image pixels.

Clause 9. The apparatus of any one of Clauses 1 to 7, wherein the stereo reconstruction (132) restricts a correspondence search (254) that is associated with the projected pixel (180), wherein the correspondence search (254) is restricted to exclude:

pixels (230) in the first set (106) of image data that are outside of a first extended group (183, 220) of pixels, the first extended group (183, 220) of pixels corresponding to the projected pixel (180) and to projected pixels (290) adjacent to the projected pixel (180); and pixels (232) in the second set (107) of image data that are outside of a second extended group (184, 222) of pixels, the second extended group (184, 222) of pixels corresponding to the projected pixel (180) and to projected pixels (292) adjacent to the projected pixel.

Clause 10. A method (400), comprising:

receiving (410) multiple sets of image data (106-108), each of the multiple sets (106-108) corresponding to a respective portion (162-164) of a surface (165) of an object (160) and a respective portion of a structured light pattern (119) projected onto the surface (165);

performing (412) a structured light reconstruction (122) of the multiple sets (106-108), wherein the structured light reconstruction (122) comprises matching (414) a first group (183) of image pixels that correspond to a projected pixel (180) of the structured light pattern (119) in a first set (106) of image data with a second group (184) of image pixels that correspond to the projected pixel (180) in a second set (107) of image data;
and performing (416) stereo reconstruction (132) of the multiple sets (106-108) to generate three-dimensional (3D) point data (134) of the surface (165) of the object (160), wherein the stereo reconstruction (132) comprises matching (418) one or more features (186, 240) detected within the first group (183) of image pixels with one or more features (187, 242) detected within the second group (184) of image pixels.

Clause 11. The method of Clause 10, further comprising, after generating the 3D point data (134), generating (420) a 3D model (152) of the object (160).

Clause 12. The method of Clause 11, further comprising controlling (422) a robotic device (156) to interact with the object (160) based on the 3D model (152).

Clause 13. The method of any one of Clauses 10 to 12, further comprising facilitating (402) a scanning operation (201) of the object (160) to generate the multiple sets (106-108) of image data.

Clause 14. The method of Clause 13, wherein the scanning operation (201) comprises:

operating (404) one or more projectors (115) to project structured light (109) to form the structured light pattern (119); and operating (406) multiple cameras (105) to capture the multiple sets (106-108) of image data.

Clause 15. The method of Clause 14, wherein each of the multiple cameras (105) has an image pixel resolution (250) that exceeds a projector pixel resolution (206) of the one or more projectors (115).

Clause 16. The method of Clause 14 or Clause 15, wherein the scanning operation (201) further comprises transporting (408) the cameras (105), the one or more projectors (115), or both, along a length of the object (160).

Clause 17. The method of any one or Clauses 10 to 16, wherein the structured light pattern (119) is encoded in the time domain.

Clause 18. The method of any one or Clauses 10 to 17, wherein the object (160) comprises a component (503) of an aircraft (504).

Clause 19. The method of any one of Clauses 10 to 18, wherein the stereo reconstruction (132) restricts a correspondence search (252) that is associated with the projected pixel (180), wherein the correspondence search (252) is restricted to exclude pixels (220, 230) in the first set (106) of image data that are outside of the first group (183) of image pixels and to exclude pixels (222, 232) in the second set (107) of image data that are outside of the second group (184) of image pixels.

Clause 20. The method of any one of Clauses 10 to 18, wherein the stereo reconstruction (132) restricts a correspondence search (254) that is associated with the projected pixel (180), wherein the correspondence search (254) is restricted to exclude:

pixels (230) in the first set (106) of image data that are outside of a first extended group (183, 220) of pixels, the first extended group (183, 220) of pixels corresponding to the projected pixel (180) and to projected pixels (290) adjacent to the projected pixel (180); and pixels (232) in the second set (107) of image data that are outside of a second extended group (184, 222) of pixels, the second extended group (184, 222) of pixels corresponding to the projected pixel (180) and to projected pixels (292) adjacent to the projected pixel.

Clause 21. A non-transitory, computer-readable medium (114, 630) storing instructions (604) that, when executed by one or more processors (116, 620), cause the one or more processors (116, 620) to initiate, perform, or control operations comprising:

receiving (410) multiple sets of image data (106-108), each of the multiple sets (106-108) corresponding to a respective portion of a surface (165) of an object (160) and a respective portion of a structured light pattern (119) projected onto the surface (165);

performing (412) a structured light reconstruction (122) of the multiple sets (106-108), wherein the structured light reconstruction (122) comprises matching (414) a first group (183) of image pixels that correspond to a projected pixel (180) of the structured light pattern (119) in a first set (106) of image data with a second group (184) of image pixels that correspond to the projected pixel (180) in a second set (107) of image data; and performing (416) stereo reconstruction (132) of the multiple sets (106-108) to generate 3D point data (134) of the surface (165) of the object (160), wherein the stereo reconstruction (132) comprises matching (418) one or more features (186, 240) detected within the first group (183) of image pixels with one or more features (187, 242) detected within the second group (184) of image pixels.

Clause 21. The non-transitory, computer-readable medium of Clause 20, wherein the structured light pattern (119) is encoded in the time domain.

Clause 22. The non-transitory, computer-readable medium of Clause 20 or Clause 21, wherein the object (160) comprises a component (503) of an aircraft (504).

Clause 23. The non-transitory, computer-readable medium of any one of Clauses 20 to 22, wherein the stereo reconstruction (132) restricts a correspondence search (252) that is associated with the projected pixel (180), wherein the correspondence search (252) is restricted to exclude pixels (220, 230) in the first set (106) of image data that are outside of the first group (183) of image pixels and to exclude pixels (222, 232) in the second set (107) of image data that are outside of the second group (184) of image pixels.

Clause 24. The non-transitory, computer-readable medium of any one of Clauses 20 to 22, wherein the stereo reconstruction (132) restricts a correspondence search (254) that is associated with the projected pixel (180), wherein the correspondence search (254) is restricted to exclude:

pixels (230) in the first set (106) of image data that are outside of a first extended group (183, 220) of pixels, the first extended group (183, 220) of pixels corresponding to the projected pixel (180) and to projected pixels (290) adjacent to the projected pixel (180); and pixels (232) in the second set (107) of image data that are outside of a second extended group (184, 222) of pixels, the second extended group (184, 222) of pixels corresponding to the projected pixel (180) and to projected pixels (292) adjacent to the projected pixel.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus, comprising:
   a memory configured to store multiple sets of image data, each of the multiple sets corresponding to a respective portion of a surface of an object and a respective portion of a structured light pattern projected onto the surface; and
   one or more processors configured to:
     perform structured light reconstruction of the multiple sets, wherein the structured light reconstruction comprises matching a first group of image pixels that correspond to a projected pixel of the structured light pattern in a first set of image data with a second group of image pixels that correspond to the projected pixel in a second set of image data; and
     perform stereo reconstruction of the multiple sets to generate three-dimensional (3D) point data of the surface of the object, wherein the stereo reconstruction comprises matching one or more features detected within the first group of image pixels with one or more features detected within the second group of image pixels, and wherein the stereo reconstruction restricts a correspondence search that is associated with the projected pixel and the correspondence search is restricted to exclude pixels in the first set of image data that are outside of the first group of image pixels and to exclude pixels in the second set of image data that are outside of the second group of image pixels.

2. The apparatus of claim 1, the one or more processors further configured to generate a 3D model of the object based on the 3D point data.

3. The apparatus of claim 1, wherein the object comprises a component of an aircraft.

4. The apparatus of claim 1, wherein the structured light pattern is encoded in the time domain.

5. The apparatus of claim 1, further comprising:
   multiple cameras configured to capture the multiple sets of image data; and
   one or more projectors, each projector configured to project structured light to form the structured light pattern.

6. The apparatus of claim 5, wherein each of the multiple cameras has an image pixel resolution that exceeds a projector pixel resolution of the one or more projectors.

7. The apparatus of claim 5, further comprising a movable frame configured to support the cameras, the one or more projectors, or both, and to transport the cameras, the one or more projectors, or both, along a length of the object during a scanning operation.

8. The apparatus of claim 1, wherein a first correspondence search group corresponds to the projected pixel and to projected pixels adjacent to the projected pixel in the first set of image data, and wherein a second correspondence search group corresponds to the projected pixel and to projected pixels adjacent to the projected pixel in the second set of image data.

9. A method, comprising:
   receiving multiple sets of image data, each of the multiple sets corresponding to a respective portion of a surface of an object and a respective portion of a structured light pattern projected onto the surface;
   performing a structured light reconstruction of the multiple sets, wherein the structured light reconstruction comprises matching a first group of image pixels that correspond to a projected pixel of the structured light pattern in a first set of image data with a second group of image pixels that correspond to the projected pixel in a second set of image data; and performing stereo reconstruction of the multiple sets to generate three-dimensional (3D) point data of the surface of the object, wherein the stereo reconstruction comprises matching one or more features detected within the first group of image pixels with one or more features detected within the second group of image pixels, and wherein the stereo reconstruction restricts a correspondence search that is associated with the projected pixel and the correspondence search is restricted to exclude pixels in the first set of image data that are outside of the first group of image pixels and to exclude pixels in the second set of image data that are outside of the second group of image pixels.

10. The method of claim 9, wherein the object comprises a component of an aircraft.

11. The method of claim 9, further comprising, after generating the 3D point data, generating a 3D model of the object.

12. The method of claim 11, further comprising controlling a robotic device to interact with the object based on the 3D model.

13. The method of claim 9, further comprising facilitating a scanning operation of the object to generate the multiple sets of image data.

14. The method of claim 13, wherein the scanning operation comprises:
operating one or more projectors to project structured light to form the structured light pattern; and
operating multiple cameras to capture the multiple sets of image data.

15. The method of claim 14, wherein each of the multiple cameras has an image pixel resolution that exceeds a projector pixel resolution of the one or more projectors.

16. The method of claim 14, wherein the scanning operation further comprises transporting the cameras, the one or more projectors, or both, along a length of the object.

17. The method of claim 9 wherein a first correspondence search group corresponds to the projected pixel and to projected pixels adjacent to the projected pixel in the first set of image data, and wherein a second correspondence search group corresponds to the projected pixel and to projected pixels adjacent to the projected pixel in the second set of image data.

18. The method of claim 9, wherein the structured light pattern is encoded in the time domain.

19. A non-transitory, computer-readable medium storing instructions that, when executed by one or more processors, cause the one or more processors to initiate, perform, or control operations comprising:

receiving multiple sets of image data, each of the multiple sets corresponding to a respective portion of a surface of an object and a respective portion of a structured light pattern projected onto the surface;

performing a structured light reconstruction of the multiple sets, wherein the structured light reconstruction comprises matching a first group of image pixels that correspond to a projected pixel of the structured light pattern in a first set of image data with a second group of image pixels that correspond to the projected pixel in a second set of image data; and performing stereo reconstruction of the multiple sets to generate three-dimensional point data of the surface of the object, wherein the stereo reconstruction comprises matching one or more features detected within the first group of image pixels with one or more features detected within the second group of image pixels, and wherein the stereo reconstruction restricts a correspondence search that is associated with the projected pixel and the correspondence search is restricted to exclude pixels in the first set of image data that are outside of the first group of image pixels and to exclude pixels in the second set of image data that are outside of the second group of image pixels.

20. The non-transitory, computer-readable medium of claim 19, wherein a first correspondence search group corresponds to the projected pixel and to projected pixels adjacent to the projected pixel in the first set of image data, and wherein a second correspondence search group corresponds to the projected pixel and to projected pixels adjacent to the projected pixel in the second set of image data.

* * * * *